United States Patent
Rudolph et al.

(10) Patent No.: US 11,757,673 B2
(45) Date of Patent: Sep. 12, 2023

(54) SYSTEMS AND METHODS FOR SOUNDING IN A FULL DUPLEX CATV ARCHITECTURE

(71) Applicant: ARRIS Enterprises LLC, Suwanee, GA (US)

(72) Inventors: Michael J. Rudolph, Naperville, IL (US); Laura N. Chen, Sugar Grove, IL (US); Santhana Chari, Johns Creek, GA (US); Ayham Al-Banna, Orland Park, IL (US)

(73) Assignee: ARRIS Enterprises LLC, Suwanee, GA (US)

(*) Notice: Subject to any disclaimer, the term of this patent is extended or adjusted under 35 U.S.C. 154(b) by 28 days.

(21) Appl. No.: 17/062,290

(22) Filed: Oct. 2, 2020

(65) Prior Publication Data

US 2021/0126807 A1    Apr. 29, 2021

Related U.S. Application Data

(60) Provisional application No. 62/937,913, filed on Nov. 20, 2019, provisional application No. 62/911,081, filed on Oct. 4, 2019.

(51) Int. Cl.
| | |
|---|---|
| *H04L 12/28* | (2006.01) |
| *H04L 5/14* | (2006.01) |
| *H04N 21/61* | (2011.01) |
| *H04B 1/10* | (2006.01) |
| *H04B 3/487* | (2015.01) |
| *H04B 3/32* | (2006.01) |

(52) U.S. Cl.
CPC ....... *H04L 12/2801* (2013.01); *H04B 1/1027* (2013.01); *H04B 3/32* (2013.01); *H04B 3/487* (2015.01); *H04L 5/14* (2013.01); *H04N 21/6118* (2013.01); *H04N 21/6168* (2013.01)

(58) Field of Classification Search
CPC ....... H04L 12/2801; H04L 5/14; H04B 3/487; H04B 1/1027; H04B 3/32; H04N 21/6118; H04N 21/6168
USPC .......................................................... 370/201
See application file for complete search history.

(56) References Cited

U.S. PATENT DOCUMENTS

| | | | |
|---|---|---|---|
| 2005/0204397 A1* | 9/2005 | Miyazoe | H04N 17/00 348/192 |
| 2009/0296794 A1 | 12/2009 | Min et al. | |
| 2018/0076910 A1 | 3/2018 | Zhang et al. | |
| 2018/0294837 A1* | 10/2018 | Chapman | H04L 1/0071 |
| 2018/0294941 A1* | 10/2018 | Chapman | H04B 3/487 |
| 2019/0165965 A1 | 5/2019 | Zhang et al. | |

FOREIGN PATENT DOCUMENTS

EP    3547554 A1    10/2019

OTHER PUBLICATIONS

PCT Search Report & Written Opinion, Re: Application No. PCT/US2020/054031, dated Mar. 22, 2021.
DVB Organization: "CM-SP-MULPiv3.1-I15-180509.pdf", DVB, Digital Video Broadcasting, C/O EBU—17A Ancienne Route—CH-1218 Grand Saconnex, Geneva—Switzerland, May 13, 2018 (May 13, 2018), XP017855009, the whole document.

* cited by examiner

*Primary Examiner* — Obaidul Huq
(74) *Attorney, Agent, or Firm* — Chernoff, Vilhauer, McClung & Stenzel, LLP

(57) ABSTRACT

Systems and methods for managing interference groups in a full duplex transmission network.

19 Claims, 13 Drawing Sheets

$$S = \begin{bmatrix} - & 32 & 0 & 0 & 27 & 0 & \boxed{25} & 0 & 0 & 0 \\ 32 & - & 0 & 40 & 0 & 0 & 0 & 0 & 0 & 0 \\ 0 & 0 & - & 0 & 0 & 0 & 29 & 0 & 0 & 0 \\ 0 & 40 & 0 & - & 42 & 0 & 0 & 0 & 0 & 0 \\ 27 & 0 & 0 & 42 & - & 0 & 0 & 0 & 0 & 0 \\ 0 & 0 & 0 & 0 & 0 & - & 39 & 0 & 28 & 0 \\ \boxed{25} & 0 & 29 & 0 & 0 & 39 & - & 31 & 0 & 0 \\ 0 & 0 & 0 & 0 & 0 & 0 & 31 & - & 0 & 25 \\ 0 & 0 & 0 & 0 & 0 & 28 & 0 & 0 & - & 35 \\ 0 & 0 & 0 & 0 & 0 & 0 & 0 & 25 & 35 & - \end{bmatrix}$$

(A) $IG_i = [CM_j] = IG_1$, [A, B, C, D, E, G, C, F, I, J, H]

(B) $IG_i = [CM_j] = IG_1$ [A, B, C, D, E]
    $IG_2$ [C, G, F, I, J, H]

FIG. 2D $$MCNT = \begin{bmatrix} 0 & 1 & 0 & 0 & 1 & 0 & 0 & 0 & 0 & 0 \\ 1 & 0 & 0 & 1 & 0 & 0 & 0 & 0 & 0 & 0 \\ 0 & 0 & 0 & 0 & 0 & 0 & 1 & 0 & 0 & 0 \\ 0 & 1 & 0 & 0 & 1 & 0 & 0 & 0 & 0 & 0 \\ 1 & 0 & 0 & 1 & 0 & 0 & 0 & 0 & 0 & 0 \\ 0 & 0 & 0 & 0 & 0 & 0 & 1 & 0 & 1 & 0 \\ 0 & 0 & 1 & 0 & 0 & 1 & 0 & 1 & 0 & 0 \\ 0 & 0 & 0 & 0 & 0 & 0 & 1 & 0 & 0 & 1 \\ 0 & 0 & 0 & 0 & 0 & 1 & 0 & 0 & 0 & 1 \\ 0 & 0 & 0 & 0 & 0 & 0 & 0 & 1 & 1 & 0 \end{bmatrix}$$

FIG. 3

$$(IG_i) = \begin{bmatrix} 0 & 1 & 0 & 1 \\ 1 & 0 & 1 & 0 \\ 0 & 1 & 0 & 1 \\ 1 & 0 & 1 & 0 \end{bmatrix} \quad T_2 = [IG_1, IG_2...]$$

FIG. 4

$$I = \begin{bmatrix} 0 & 0 & 1 & 0 & 0 & 1 & 1 & 1 & 1 & 1 \\ 0 & 0 & 1 & 0 & 0 & 1 & 1 & 1 & 1 & 1 \\ 1 & 1 & 0 & 1 & 1 & 0 & 0 & 0 & 0 & 0 \\ 0 & 0 & 1 & 0 & 0 & 1 & 1 & 1 & 1 & 1 \\ 0 & 0 & 1 & 0 & 0 & 1 & 1 & 1 & 1 & 1 \\ 1 & 1 & 0 & 1 & 1 & 0 & 0 & 0 & 0 & 0 \\ 1 & 1 & 0 & 1 & 1 & 0 & 0 & 0 & 0 & 0 \\ 1 & 1 & 0 & 1 & 1 & 0 & 0 & 0 & 0 & 0 \\ 1 & 0 & 0 & 1 & 1 & 0 & 0 & 0 & 0 & 0 \\ 1 & 1 & 0 & 1 & 1 & 0 & 0 & 0 & 0 & 0 \end{bmatrix}$$

FIG. 6A $$T_1 = [\, SG_1, SG_2 \ldots \,]$$

FIG. 6B

| DATE | TIME | TEMP | ... | BASELINE SOUNDING DATA | | | |
|---|---|---|---|---|---|---|---|
| | | | | CM1 | CM2 | ... | CMn |
| — | — | — | — | — | — | — | — |
| ... | ... | ... | ... | ... | ... | ... | ... |
| ... | ... | ... | ... | ... | ... | ... | ... |

FIG. 10

SYSTEMS AND METHODS FOR SOUNDING IN A FULL DUPLEX CATV ARCHITECTURE

CROSS REFERENCE TO RELATED APPLICATIONS

This application claims priority under 35 U.S.C. § 119(a) to U.S. Provisional Application Ser. No. 62/911,081 filed on Oct. 4, 2020 and U.S. Provisional Application Ser. No. 62/937,913 filed on Nov. 20, 2019, both of which are hereby incorporated by reference.

BACKGROUND

The subject matter of this application relates to systems and methods that organize groups of cable modems into Interference Groups to facilitate full duplex transmission in CATV architectures.

Cable Television (CATV) services provide content to large groups of subscribers from a central delivery unit, called a "head end," which distributes channels of content to its subscribers from this central unit through a branch network comprising a multitude of intermediate nodes. Modern Cable Television (CATV) service networks, however, not only provide media content such as television channels and music channels to a customer, but also provide a host of digital communication services such as Internet Service, Video-on-Demand, telephone service such as VoIP, and so forth. These digital communication services, in turn, require not only communication in a downstream direction from the head end, through the intermediate nodes and to a subscriber, but also require communication in an upstream direction from a subscriber and to the content provider through the branch network.

To this end, CATV head ends have historically included a separate Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern CATV systems have combined the functionality of the CMTS with the video delivery system (EdgeQAM) in a single platform called the Converged Cable Access Platform (CCAP). Still other modern CATV systems called Remote PHY (or R-PHY) relocate the physical layer (PHY) of a traditional CCAP by pushing it to the network's fiber nodes. Thus, while the core in the CCAP performs the higher layer processing, the R-PHY device in the node converts the downstream data sent by the core from digital-to-analog to be transmitted on radio frequency, and converts the upstream RF data sent by cable modems from analog-to-digital format to be transmitted optically to the core.

Regardless of which such architectures were employed, historical implementations of CATV systems bifurcated available bandwidth into upstream and downstream transmissions, i.e. data was only transmitted in one direction across any part of the spectrum. For example, early iterations of the Data Over Cable Service Interface Specification (DOCSIS) specified assigned upstream transmissions to a frequency spectrum between 5 MHz and 42 MHz and assigned downstream transmissions to a frequency spectrum between 50 MHz and 750 MHz. Though later iterations of the DOCSIS standard expanded the width of the spectrum reserved for each of the upstream and downstream transmission paths, the spectrum assigned to each respective direction did not overlap.

Recently, cable operators have searched for alternative architectures to deliver multi-gigabit services. This need, together with recent trends in the cable industry such as deployment of DOCSIS 3.1 Orthogonal Frequency Division Multiplexing (OFDM), deep fiber migration, and remote PHY network architectures, have resulted in the development and standardization of the full duplex (FDX) DOCSIS technology. With FDX DOCSIS, upstream and downstream spectrum is no longer separated, allowing up to 5 Gbps upstream service and 10 Gbps downstream service over the cable access network. In a full duplex system, because the CCAP/R-PHY core knows the characteristics of its own downstream transmission, it can distinguish upstream communications transmitted in the same frequencies that it provides those downstream services.

In FDX systems, however, interference between the bi-directional transmissions must be mitigated for the intended downstream signals to be properly received. In a point-to-multi-point system, where multiple cable modems (CMs) are connected to the same Cable Modem Termination System (CMTS) port, when one CM transmits upstream to the CMTS, the upstream signal may leak through the cable plant and interfere with reception of downstream signals received by other cable modems. Since the source of the interference is unknown to the receiving cable modem, techniques such as PHY layer echo cancellation cannot be used.

What is desired, therefore, are improved systems and methods for mitigating interference in full duplex CATV transmission architectures.

BRIEF DESCRIPTION OF THE DRAWINGS

For a better understanding of the invention, and to show how the same may be carried into effect, reference will now be made, by way of example, to the accompanying drawings, in which:

FIG. 2D shows the implementation of the graph-based sorting method of FIG. 2A on a sounding matrix.

FIG. 3 shows an exemplary Interference Matrix indicating, for each cable modem in the graph of FIG. 2A, which modems interfere with each other.

FIG. 4 shows an exemplary Sub-Graph (SG) Interference Matrix indicating which modems, within a particular Interference Group, interfere with each other as well as an exemplary array T2 that identifies IGs created using a sounding procedure at a first time that can be subdivided based on a second sounding procedure at a later time.

FIG. 6A shows an exemplary IG matrix that identifies, for each modem in the graph of FIG. 2A, which other modems in that graph belong to the same IG.

FIG. 6B shows an exemplary array T1 that identifies IGs created using a sounding procedure at a first time that include modems that interfere with at least one modem in another IG at a second time, based on a second sounding procedure.

FIG. 10 shows an exemplary table of historical baseline sounding tests used by the system of FIG. 9.

SUMMARY

Figure 1:
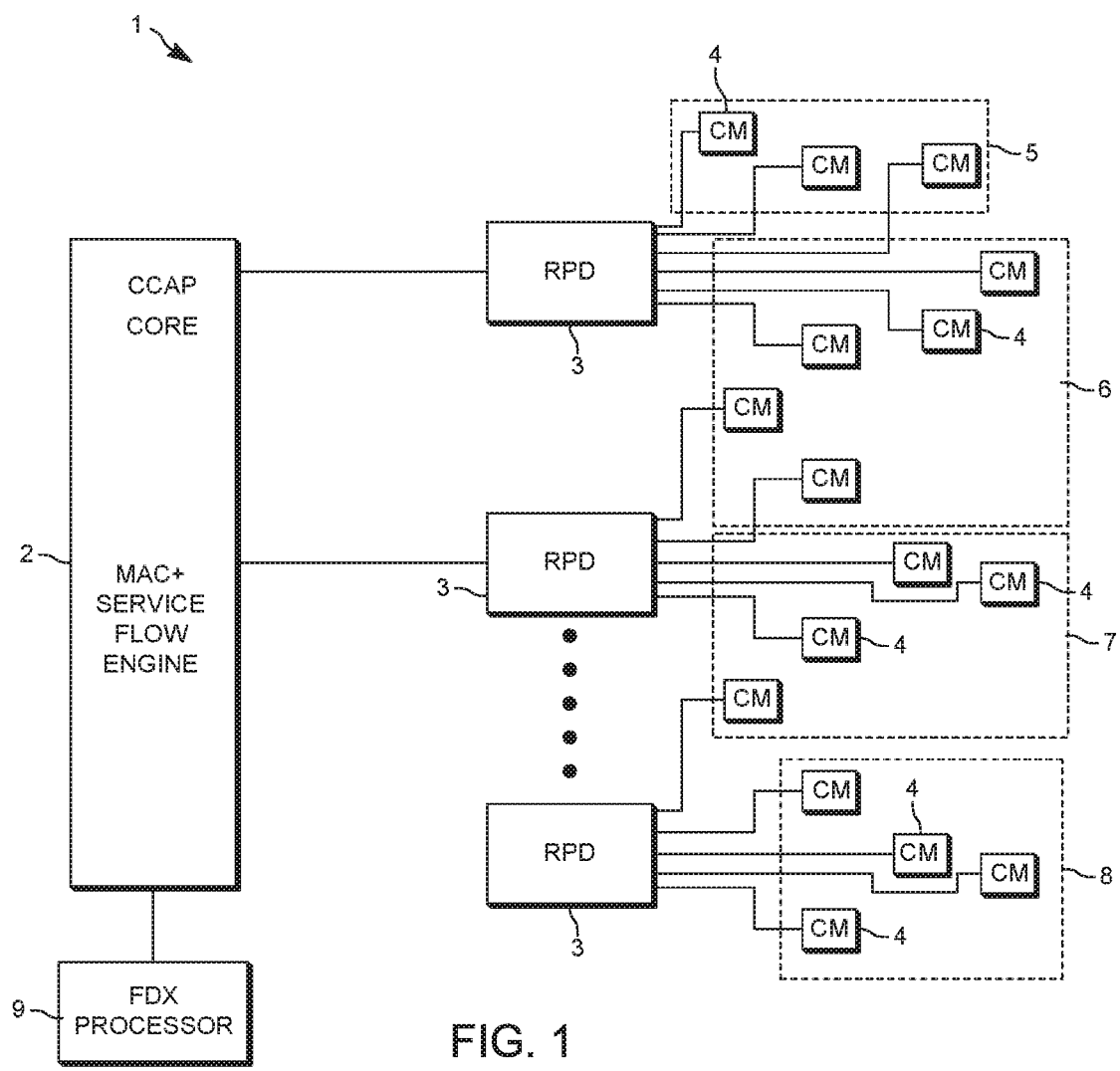
FIG. 1 shows an exemplary full duplex R-PHY CATV architecture where many individual cable modems, each connected to a CCAP core through a branch network of RPD devices, are sorted into Interference Groups organized to minimize interference in the downstream signal caused by upstream transmissions.

In a first embodiment, a CATV system may comprise a head end connected to a plurality of modems through a transmission network, the plurality of modems arranged into a first set of at least one interference group (IG). The system may include a processor operatively connectable to the head end and capable of reorganizing the plurality of modems into a second set of at least one IG different than the first set of at least one IG. The processor may reorganize the plurality of modems based on the first set of at least one IG.

In some embodiments of the foregoing CATV system, a graph-based connected components technique may be used to process an array based on sounding data to reorganize the plurality of modems into the second set of at least one interference group. The graph may be unidirected or directed. In some circumstances the graph-based connected components technique may be applied to only a subset of the sounding data, the subset based on identified incremental changes from the first set of at least one interference group. In some embodiments, the identified incremental changes may include a pair of modems in different IGs interfering with each other at a current time, and which were not interfering with each other at a previous time. In some embodiments, the identified incremental changes include a pair of modems in the same IG no longer interfering with each other.

The graph based connected components technique may be based on a graph having nodes and edges. The nodes may correspond to individual cable modems and the edges may connect nodes, and each have an associated interference metric measured by a sounding procedure on the CATV system.

In a second embodiment, a method may arrange a plurality of modems in CATV system. The method may automatically arrange, by a processor operatively connected to a head end of the CATV system, the plurality of modems into a first arrangement of at least one interference group. The processor may automatically reorganize the plurality of modems into a second arrangement of at least one IG different than the first arrangement of at least one IG, using the first arrangement.

In some embodiments of the foregoing CATV system, a graph-based connected components technique may be used to process an array based on sounding data to reorganize the plurality of modems into the second arrangement. The graph may be unidirected or directed. In some circumstances the graph-based connected components technique may be applied to only a subset of the sounding data, the subset based on identified incremental changes from the first arrangement. In some embodiments, the identified incremental changes may include a pair of modems in different IGs interfering with each other at a current time, and which were not interfering with each other at a previous time. In some embodiments, the identified incremental changes include a pair of modems in the same IG no longer interfering with each other.

Some embodiments may use a graph having nodes and edges. The nodes may correspond to individual cable modems and the edges may connect nodes, and each have an associated interference metric measured by a sounding procedure on the CATV system In a third embodiment, a processing system may exchanges data between a head end and a plurality of cable modems through a transmission network, the processing system may include a processor that selectively initiates periodic baseline sounding tests of the cable modems and periodic full sounding tests of the cable modems, the full sounding tests producing more data than the baseline sounding tests. The processing system may include a memory that stores at least one historical baseline sounding test. The processor may perform a current baseline sounding test and use a comparison of the current baseline sounding test to the at least one record of a historical baseline test to select whether to initiate a full sounding test.

The processing system described above may perform a baseline sounding test that measures noise at each cable modem when no cable modems are transmitting data. The baseline sounding test may produce records comprising vectors of per-band noise measurements at a multiplicity of frequency bands spanning a spectrum of interest.

The processing system may include a database that stores a plurality of historical baseline sounding records, and the processor uses one selected record from among the plurality of historical baseline sounding records to compare to a current baseline sounding test, and uses the comparison to select whether to initiate a full sounding test. For example, at least one record of a historical baseline test may includes at least one of a day of the week of each at least one record and a time of day of each at least one record. Alternatively, or additionally, at least one record of a historical baseline test may include at least one weather metric associated with each at least one record, such as ambient temperature data occurring at the time of the baseline sounding test associated with the record. Such metrics in some embodiments may be obtained from a meteorological database after the at least one record of a historical baseline test is created.

A fourth embodiment may comprise a method for exchanging data between a head end and a plurality of cable modems through a transmission network. The method may selectively initiate periodic baseline sounding tests of the cable modems and periodic full sounding tests of the cable modems, the full sounding tests producing more data than the baseline sounding tests. At least one record of a historical baseline sounding test may be stored in memory, and then a current baseline sounding test performed. A comparison of the current baseline sounding test to the at least one record of a historical baseline test may be used to select whether to initiate a full sounding test.

The method of the fourth embodiment may perform a baseline sounding test that measures noise at each cable modem when no cable modems are transmitting data. The baseline sounding test may use records comprising vectors of per-band noise measurements at a multiplicity of frequency bands spanning a spectrum of interest.

The method of the fourth embodiment may use a database that stores a plurality of historical baseline sounding records, and use one selected record from among the plurality of historical baseline sounding records to compare to a current baseline sounding test, and use the comparison to select whether to initiate a full sounding test. For example, at least one record of a historical baseline test may include at least one of a day of the week of each at least one record and a time of day of each at least one record. Alternatively, or additionally, at least one record of a historical baseline test may include at least one weather metric associated with each at least one record, such as ambient temperature data occurring at the time of the baseline sounding test associated with the record. Such metrics in some embodiments may be obtained from a meteorological database after the at least one record of a historical baseline test is created.

DETAILED DESCRIPTION

As already noted, the DOCSIS specification has historically used different frequency bands for upstream and downstream data traffic. Even though multiple cable modems in a given service group share the same network resources, the upstream and downstream traffic are completely isolated. Recently, in an attempt to offer symmetric services in both upstream and downstream, new FDX (Full Duplex) standards have been introduced to use a portion of the coaxial network bandwidth simultaneously for both upstream and downstream traffic. In an FDX architecture, the CMTS will simultaneously receive and transmit in the same FDX spectrum, while FDX Cable modems can either receive or transmit in the same FDX spectrum, but not both. The FDX band is divided into sub-bands, and the CMTS assigns which sub-band(s) each cable modem uses for upstream or downstream operation. This is referred to as a resource block assignment (RBA). Different cable modems will have different bandwidth demand for both the upstream and downstream directions, which can change over time, and FDX accordingly allows for the RBA to be changed dynamically. Thus, communication is full duplex from the perspective of the CMTS but is frequency division duplex from the perspective of the cable modem.

However, in an FDX architecture, RF signals from a modem transmitting data in the upstream direction can interfere with other modems receiving data in the downstream direction. Such interference can be minimized by organizing modems into Interference Groups. Referring to FIG. 1, for example, a CATV transmission architecture 1 may include a CCAP 2 at a head end connected to a plurality of cable modems 4 via a branched transmission network. The architecture of FIG. 1 is shown as an R-PHY system where the CMTS operates as the CCAP core while Remote Physical Devices (RPDs) are located downstream, but alternate systems may use a traditional CCAP operating fully in an Integrated CMTS in a head end, connected to the cable modems 4 via a plurality of nodes/amplifiers.

Preferably, to facilitate FDX transmission, the cable modems are organized into Interference Groups (IGs) 5, 6, 7, 8, etc. As the name indicates, an IG is a collection or group of modems where the upstream transmission of one or more of the modems in the IG will unacceptably interfere with downstream reception of other modems in the IG, but will not unacceptably interfere with downstream transmissions of cable modems in any other IG. Identifying these IGs and using the IG groups to appropriately schedule downstream and upstream transmissions is crucial to achieving high throughput in FDX systems by allowing the CCAP to schedule downstream transmissions to all cable modems in an IG at a time when no cable modem in that IG is transmitting in the upstream direction.

To facilitate organization of cable modems into IGs, a sounding technique may be used to measure the interference caused to other cable modems in a network by the upstream transmissions a particular cable modem. During sounding, a given modem sends out pilot signals in the upstream while the rest of the modems in the service group measure their downstream modulation error rate (RxMER). This process is repeated by different transmitting modems resulting in a matrix showing the co-channel interference for the whole service group.

Figure 2A:
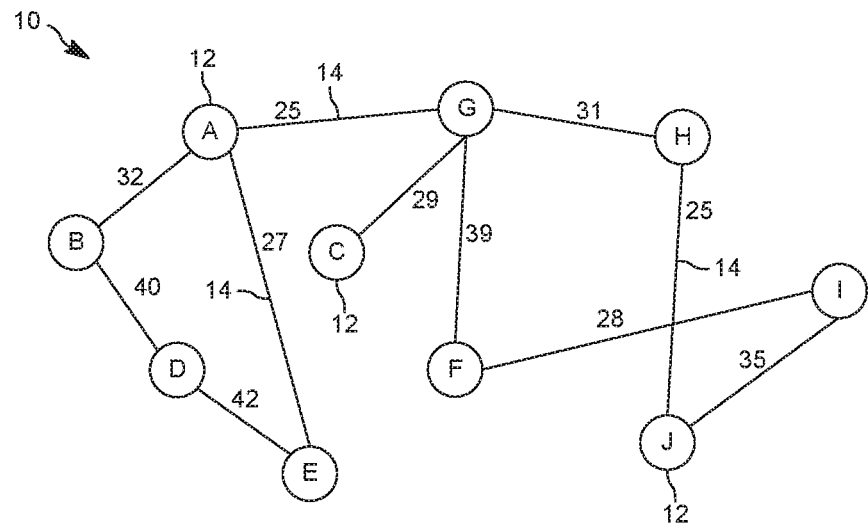
FIG. 2A shows an exemplary non-directional graph used to sort the cable modems of FIG. 1 into Interference Groups.
Figure 2B:
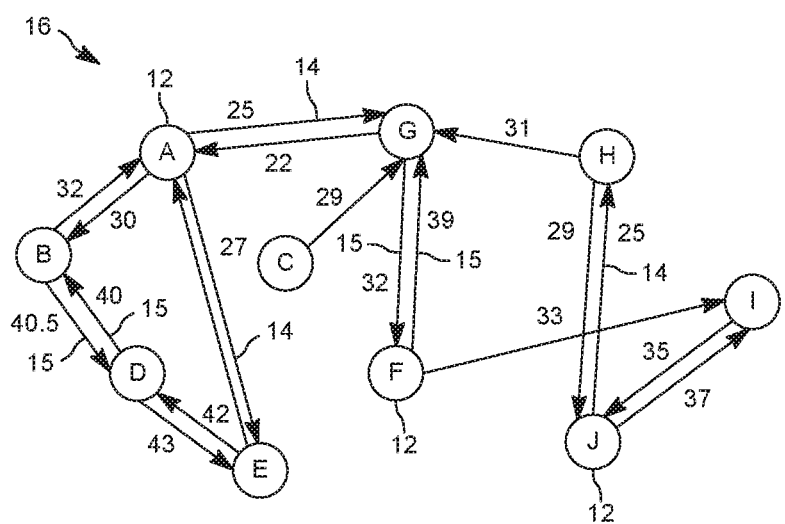
FIG. 2B shows an alternate exemplary directional graph used to sort the cable modems of FIG. 1 into Interference Groups.
Figure 2C:
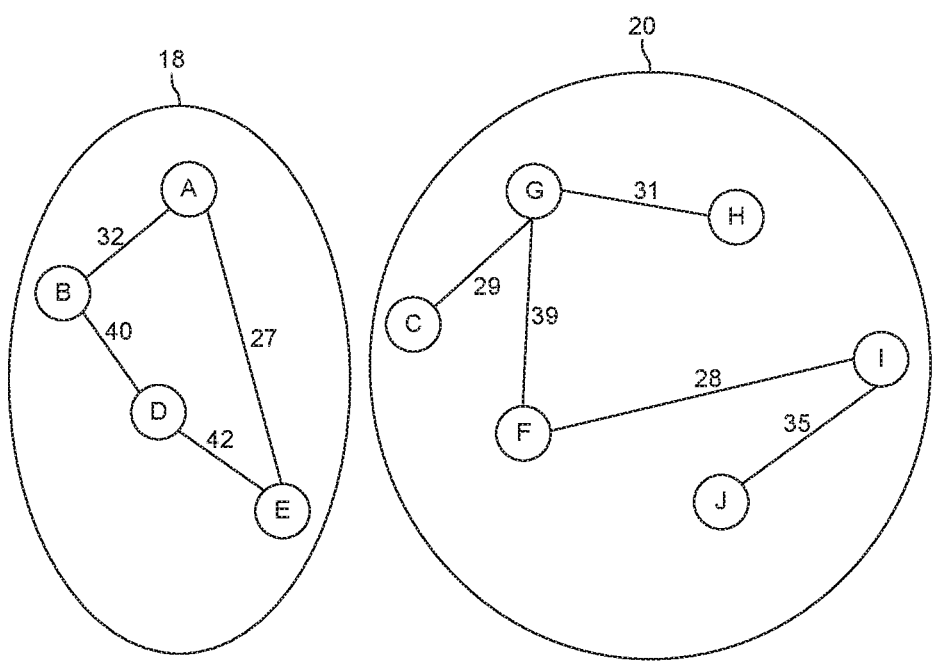
FIG. 2C shows the cable modems of FIG. 2A sorted into two interference groups using a threshold of 25 dB.

In some embodiments, sounding data may be collected from a large number of service groups from several CCAP cores, and the collected data may be processed in a centralized processor 9 shown in FIG. 1 to organize the cable modems into respective IGs. Therefore, there is a need for highly efficient algorithms that can scale with a very large number of SGs. In addition, data may be collected repeatedly from the same set of SGs. This necessitates algorithms that can efficiently handle the incremental data A given service group (SG) serviced by a CMTS/CCAP system can have several tens or hundreds of cable modems. FIGS. 2A-2C show a novel graph-based approach to efficiently organize such a large number of cable modems into IGs using sounding data. In this approach, a network graph is created where individual modems form a node of the graph. The edges of the graph is the measure of the RxMER obtained as a result of the sounding process.

As an example, FIG. 2A shows a graph 10 containing ten nodes 12, each corresponding to an individual modem in a network serviced by a CMTS/CCAP. Each cable modem is connected to other cable modems in the network by edges 14 that quantitatively indicate the interference between the two connected modems as measured in the sounding procedure. Though in reality, each node 12 in FIG. 1 should be connected by an edge 14 to every other node 12, since transmissions by any cable modem will cause at least some noise in all other cable modems, for simplicity, FIG. 1 omits those edges 14 where the MER measured by the sounding procedure is so low as to be presumed not to cause interference.

For simplicity, FIG. 2A furthermore shows an undirected graph where the edges 14 between the nodes 12 do not have a direction. Another more realistic embodiment is a directed graph 16 as shown in FIG. 2B, where the edges 14 have a direction 15 shown by arrows. An edge 14 in the direction from node A to node B represents the interference observed by node B when node A is transmitting the beacon signal during the sounding algorithm, while the edge 14 in the direction from node B to node A represents the interference observed by node A when node B is transmitting the beacon signal during the sounding algorithm. Those of ordinary skill in the art will appreciate that the weight of the edge (interference) in the direction from A to B need not be same as the weight of the edge (interference) in the direction from B to A. Those of ordinary skill in the art will also appreciate that in some cases, there is an edge between two nodes in only one direction and not the other (for example between nodes G and C, which indicates that when node C is transmitting there is appreciable interference observed at node G, whereas while node G is transmitting there no appreciable interference in node C. Such asymmetry may be unlikely, but nevertheless is possible and may be incorporated into the disclosed embodiments.

A directed graph can be reduced to an un-directed graph for computational simplicity based on various factors. For example, directed edges between nodes A and B can be replaced by an undirected edge with a weight value equal to the average, the maximum, or the of the weights of the two directed edges between nodes A and B, or any other appropriate metric. For example, the undirected graph of FIG. 2A utilizes the maximum of the directional weights of FIG. 2B.

Analytically, the disclosed graph-based solution consists of two steps. The first step is creating a graph as described previously based on data collected during the sounding process, optionally by using a first directed graph to produce an un-directed graph. The second step is to derive the interference groups by using a connected components algorithm on the graph to organize the original graph into one or more sub-graphs (SG) such that in each individual SG: (i) there is a path that exists between any pair of nodes in the SG; and (ii) no path exists between two nodes in any two different SGs. The SGs can then be used as IGs. Connected components algorithms can be applied to both directed and un-directed graphs. For the sake of simplicity, the remainder of the disclosure provides examples connected component analysis upon un-directed graphs. However, those of ordinary skill in the art will recognize how such methods can be modified to be used on directed graphs.

For example, a connected components algorithm applied to the un-directed graph of FIG. 2A would produce a single IG comprising all modems because a path exists that connects each node to every other node. However, now assume that based on the modulation scheme used to transmit data to and from the cable modems represented by the nodes, that the modems can tolerate an RxMER level of 25 dB or lower. Under this assumption, the link between node A and node G can be removed. Applying the connected component algorithms to this modified graph will result in two SGs 18 and 20 as shown in FIG. 2C, and the SGs in turn correspond to IGs defined in the FDX standard. Connected component algorithms of different complexity level using depth-first or breadth-first search can be applied to obtain IGs shown in FIG. 2C.

FIG. 2D shows how this graph-based, connected components algorithm may be directly implemented on a sounding interference matrix S. Specifically, the sounding matrix S shown in FIG. 2D corresponds to the data shown in FIG. 2A. The slashes along the diagonal indicate that individual modems do not interfere with each other. Beginning arbitrarily with node A and proceeding through the matrix, for example, Node A is first added to a sub-graph $IG_1$, and then the sub-graph $IG_1$ is completed by iteratively tracing all paths that begin from each node previously added to the sub-graph until the path either terminates or loops to another node already in the sub-graph. Thus, matrix X shows that Node A is connected to Node B, which is connected to Node D, which is connected to Node E, which is connected to no further node. Working back through the path, neither Node D, nor node B connect to any additional node not already in the matrix S. Working further back, Node A is connected to node D, which is already included, but is further connected to Node G, which is now added to the sub-graph $SG_1$. Continuing this procedure from node G will successively add nodes C, F, I, J, and H further to the sub-graph $IG_1$ until all nodes are in $IG_1$, thus duplicating the graph shown in FIG. 2A.

Again assuming, however, that RxMER measurements of 25 dB or less are acceptable, and the values of "25" and "22" as shown in FIG. 2B corresponding to the interference between nodes A and G are replaced by zeros, then the foregoing procedure will produce two IGs, $IG_1$ and $IG_2$. Specifically, as before, tracing a path through matrix S from node A will successively add nodes A, B, D, and E to sub-graph $IG_1$, but then no further nodes will be added because there is no longer an MER value connecting node A to node G. Then a new sub-graph $SG_2$ is created, beginning with the next node C and a path is traced that will successively add nodes G, F, I, J, and H to sub-graph $SG_2$, thereby producing the result shown in FIG. 2C.

Figure 2E:
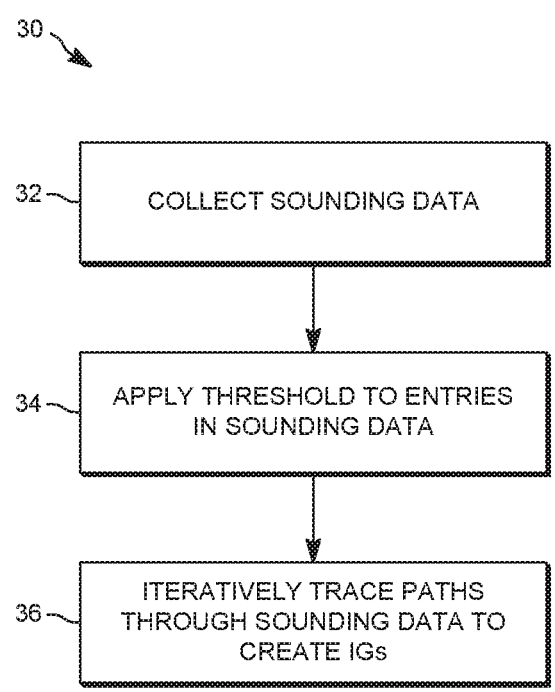
FIG. 2E shows a method that corresponds to the implementation of FIG. 2D.

Referring to FIG. 2E, the foregoing procedure can be summarized by a process 30 that at step 32 collects sounding data. At optional step 34, a threshold is applied to entries in the sounding data to reflect a demarcation between acceptable and unacceptable interference between cable modems. At step 36, sub-graphs (i.e. IGs) are created by iteratively tracing paths through non-zero values in the sounding data. Those of ordinary skill in the art will appreciate that, although one such iterative path-tracing technique was described in the preceding paragraphs, other such iterative techniques may readily be substituted. As one example, rather than trace one complete path at a time, then moving to another node in the sub-graph to completely trace that path, and so forth to fill a sub-graph, other techniques may trace in parallel all paths beginning from an initial node added to the sub-graph, e.g. from initial node A in matrix S of FIG. 2D, adding all of nodes B, E, and G to the subgroup (from Node A), then adding node D (traced from either node B or Node E) and nodes C, F and H (from node G) and so forth. Still alternatively, the matrix S may simply reflect 1s and 0s to indicate acceptable interference or unacceptable interference, or the threshold may be applied at each step in the path-building process through matrix S rather than being used in a separate step to alter the matrix S.

Every time data from sounding procedure is received, the connected components algorithm can be invoked to identify the IGs. However, as data is collected on a regular basis, the amount of computation required increases drastically and the brute-force application of the connected components algorithm does not take advantage of the likelihood that most IGs will not change in successive data collection runs. To exploit this and to reduce the computation requirements, some embodiments of the present disclosure may use any of a number of incremental processing techniques. To facilitate such techniques, the sounding data from the most recent past sounding procedure, the and any IGs obtained and/or other results from the connected components algorithm obtained from the most recent past procedure may each be selectively stored and subsequently used in the next iteration, to reduce computational requirements.

Let G be the graph containing all the nodes in an FDX group. If N is the list of all nodes (modems) in an FDX group and E is the list of all edges indicating the interference between modems, then $$G=(N,E)$$

Upon running the connected components algorithm, the graph G is subdivided into multiple connected components (IGs) or sub-graphs G1, G2, ... $G_k$. Therefore, $G=G1 \cup G2 \cup \ldots \cup G_k$ (where $\cup$ is the union operation).

The complexity of a connected components algorithm scales with the number of nodes and edges in a given graph, i.e., the complexity of the algorithm is proportional to $O(|N|+|E|)$, where $|N|$ is the number of nodes in list N and $|E|$ is the number of edges connecting any pair of nodes. Therefore, running the connected components algorithm after every iteration of data collection is preferably avoided, or alternatively, the connected components algorithm is run over a smaller subset of data to reduce the computational complexity.

To simplify the following discussion, let us assume that a binary matrix M(n) represents the interference information based on the data collected in iteration n. Matrix M(n) is of size $|N| \times |N|$ and the entry in the $i^{th}$ row and $j^{th}$ column of the matrix M(n) is 1 is Modem i interferes with Modem j and 0 otherwise. FIG. 3 shows the matrix M(N) corresponding to FIG. 2A.

A simple technique to minimize computational requirement is to store the result of M(t−1) and then compare M(t) with M(t−1). If there are no changes between M(t) and M(t−1), then there is no need to run the connected components algorithm on the sounding data collected during iteration t. This simple check may turn out to be true for multiple iterations, resulting in no additional computation required. However, there are more nuanced, smaller changes in interference data that can be used to further reduce computational requirements.

Specifically, there are two types of incremental changes that can be made to a set of sub-graphs created by the disclosed connected components algorithm. The first incremental change (Type 1) is when a modem in an IG group G may start interfering with a modem in another group G in iteration t. This interference may result in those two groups G and G to be merged to create a larger IG. Those of ordinary skill in the art will appreciate that, if a modem starts interfering with another modem in the same IG that it did not interfere with in the previous iteration t−1 (and nothing else has changed), then this does not cause any changes to that IG in iteration t.

The second incremental change (Type 2) occurs when a modem in IG group G may stop interfering with another modem in the same IG. This may result in the IG group G being split into two smaller IG groups. Those of ordinary skill in the art will appreciate that, in some embodiments, Type 2 changes may be either ignored, or selectively corrected. However, Type 1 changes cannot be ignored, since they adversely affect the throughput performance of FDX due to interference.

Since correcting type 2 incremental changes is analytically simpler, it will be discussed first. Referring to FIG. 4, an interference matrix $I(IG_i)$ for an individual sub-graph or IG may be constructed from the sounding data stored for an interval incrementally before a current round of sounding. This matrix identifies modems/nodes that interfere with each other with "1"s and modems/nodes that do not interfere with each other with "0" s. Thus, the matrix shown in FIG. 4 reflects the IG 18 shown in FIG. 2C where each row and column corresponds to nodes A, B, D, and E in the matrix M of FIG. 3. A second matrix is constructed for that IG using a current round of sounding, except that in this second matrix, "0"s represent modems that interfere with each other and "1"s represent modems that do not interfere with each other. Therefore, by performing a logical "AND" operation on these two matrices to produce a third matrix, any value of "1" in the matrix corresponds to a pair of modems that, in the same IG, started off interfering with each other at time t−1, but no longer interfere with each other at time t. By sequentially applying this procedure to each individual SG and populating an array T2 (also shown in FIG. 4) with any IG for which a "1" appeared in the matrix resulting from the AND operation, the array T2 lists SGs that are candidates to be further divided. The connected components algorithm may then be applied individually only on those smaller IGs identified in the array T2. Those of ordinary skill in the art will appreciate that the individual sub-graphs (IGs) tend to be much smaller than the original graph G and therefore results in computational savings. Furthermore, as already noted, in some embodiments, detecting and optimizing Type 2 changes need not be run for every sounding algorithm iteration. Those of ordinary skill in the art will appreciate that an alternate procedure may simply modify the foregoing procedure to construct the second matrix exactly as the first matrix of FIG. 4 was constructed, and simply compare the two to identify any change, regardless of whether a pair of modems switched from interfering to non-interfering, or vice versa.

Figure 5:
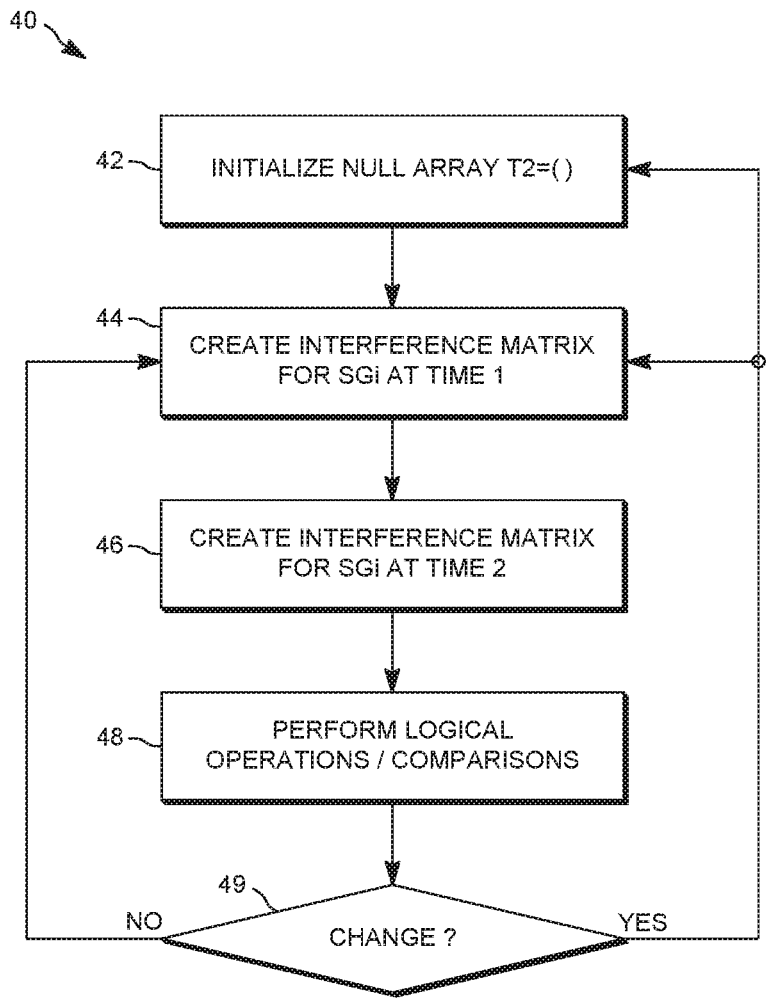
FIG. 5 shows an exemplary method that populates the array T2 of FIG. 4B using the SG Interference Matrix of FIG. 4A.

FIG. 5 shows a method 40 for implementing the procedure just described. At step 42 a null array T2 is initialized, containing a value of "0" for each IG identified in a previous implementation of the connected components algorithm. At step 44 the first matrix, i.e. an interference matrix as previously described is constructed for a first IG, from data obtained in the most previous round of sounding, and at step 46 the second matrix, i.e. a non-interference matrix, is constructed for the first IG as previously described, from data obtained in a current round of sounding. At step 48 a logical AND operation is performed on these two matrices to produce a third matrix, or the two matrices are otherwise compared. From the comparison of step 48, it is determined at step 49 whether a required change between the first and second matrices has occurred, e.g. whether two modems which were interfering with each other are no longer doing so or whether any change in interference status occurred from one round of sounding to the next. If the answer is "yes" then the value for that IG in the array T2 is changed, and the procedure proceeds to the next IG in the array. If the answer is no, the procedure proceeds to the next IG in the array without changing any value in the array T2. When no IGs remain, the array T2 may be used to identify IGs that may be run again through the connected component algorithm.

Referring to FIGS. 6A and 6B, a different procedure may be used to identify Type 1 changes. Specifically, referring to FIG. 6A, an interference group matrix I may be constructed from the most previous prior round of sounding data that, for every modem or node in the collection of IGs, indicates whether one modem/node is in the same IG as another modem/node, i.e. if modem i (row i of the matrix) and modem j (column j of the matrix) are in the same IG, then the corresponding entry is 0 and is 1 otherwise. Because this data exists from the previous round of sounding, little further processing is required to construct this matrix. As can be seen, the matrix I of FIG. 6A corresponds to the sub-graphs shown in FIG. 2C constructed using the matrix M of FIG. 3.

Then a second matrix M as shown in FIG. 3 is constructed using sounding data from a current round of sounding, and a logical "AND" operation is applied to the two matrices, thereby identifying any instance where two cable modems are currently interfering with each other that are not currently within the same IG. After performing the logical AND operation, if any of the entries in a row i (or a column j) of the matrix is 1, the IG that the Node i (or j) belonged to in the previous iteration should be added to the array T1 (shown in FIG. 6B). When array T1 is fully populated, the connected components algorithm can be applied to the union of the IGs identified in the array T1. Those of ordinary skill in the art will appreciate that, instead of first constructing a matrix I as seen in FIG. 6A, individual arrays associated with each node/modem may be constructed to (1) identify other nodes/modems in the same SG as that modem, and (2) other nodes/modems that currently interfere with that individual modem. Then an "AND" operation may be applied to these arrays, relevant SGs added to array T1, and the procedure moving to the next node/modem etc. until the array T1 is fully populated. Those of ordinary skill in the art will also appreciate that, regardless of which technique us used, in most cases this requires procedure less computation, since this graph will be substantially smaller than the original graph G because of small changes in sounding interference in successive iterations and the fact that complexity of the connected components algorithm is proportional to $O(|N|+|E|)$.

Figure 7:
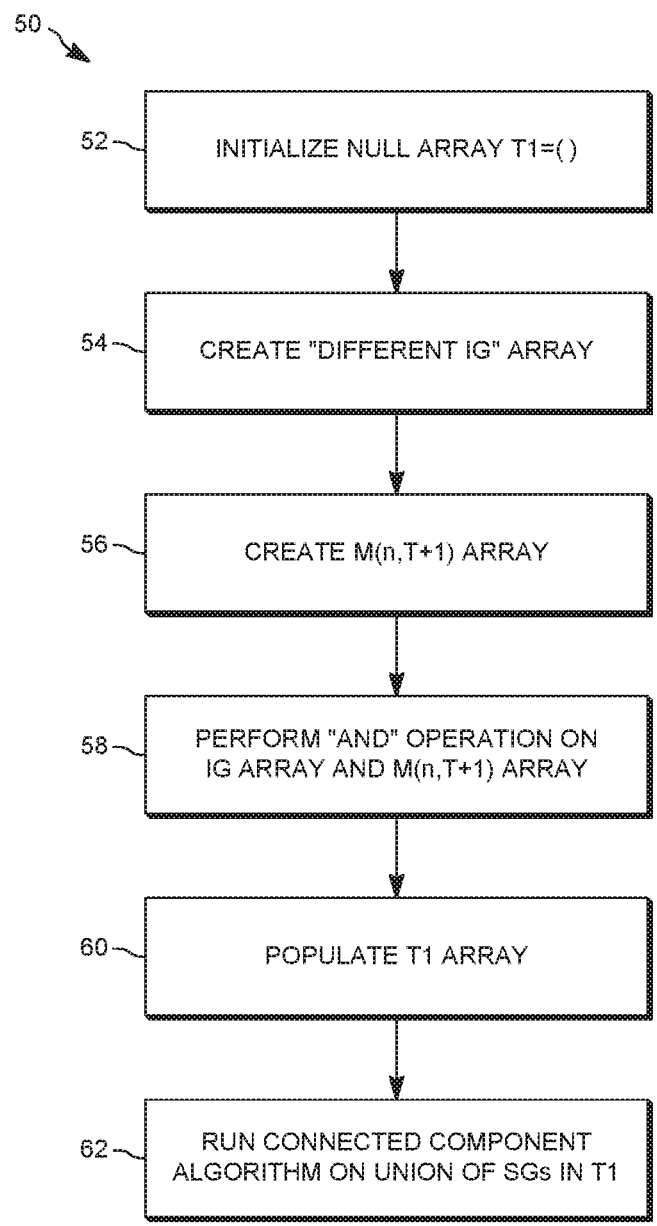
FIG. 7 shows an exemplary method that populates the array T1 of FIG. 6B using the IG Matrix of FIG. 4A.

FIG. 7 shows a method 60 for implementing the procedure just described. At step 62 a null array T1 is initialized, containing a value of "0" for each IG identified in a previous implementation of the connected components algorithm. At step 64 the I matrix indicating which node/modem pairs are in different IGs, as previously described, is constructed from data obtained in the most previous round of sounding, and at step 66 matrix M (as disclosed in FIG. 3) is constructed as previously described from data obtained in a current round of sounding. At step 68 a logical AND operation is performed on these two matrices to produce a third matrix for which values of "1" indicate node/modem pairs in different IGs that are currently interfering with each other. In step 60, an array T1 is populated using this third matrix to identify any IG having a node/modem flagged in the third matrix. AT step 62 the connected components algorithm is applied to the union of IGs in T1.

Those of ordinary skill in the art will appreciate that the procedures just described may be combined to provide still further efficiencies. For example, if the procedure used to identify Type 2 changes identifies only those instances where a modem/node pair in an IG switched from interfering with each other to not interfering with each other, then the connected components algorithm can be applied to potentially divide those identified SGs. Then the Type 1 changes may be identified by constructing the I matrix shown in FIG. 6A using the new IG organization. Since it is then known that each IG cannot be further subdivided, when the Type 1 procedure then proceeds to populate the T1 array, the values in the array may be used to directly merge IGs without the need for the connected component algorithm.

Alternatively, the Type 1 changes may be identified first to populate the T1 array, then to run the connected components algorithm on the union of the IGs identified in the T1 array. Since the connected component algorithm will itself organize all modems/nodes in these IGs into the smallest possible combinations, the Type 2 change procedure need only be run on the remaining IGs not included in the T1 array.

While the foregoing systems and methods redress inefficiencies in processing sounding data to dynamically assign cable modems to one or more Interference Groups (IGs), the sounding process itself imposes significant overhead on the transmission system. As noted above, a sounding procedure requires that the CMTS directs one or more FDX capable CMs to transmit test signals on designated subcarriers, while directing other FDX capable CMs to measure and report the received Transmission Modulation Error Ratio (RxMER) on the same set of subcarriers. The CMTS repeats this procedure using other CMs as transmitters until the interference levels are tested between all CM combinations. Further, the CMTS may repeat this on all relevant subcarriers.

There are two types of sounding typically employed in FDX systems—Continuous Wave (CW) sounding and OFDMA Upstream Data Profile (OUDP) sounding. During CW sounding, one or multiple test cable modems send CW test signals at selected subcarrier frequency locations (cable modems each support up to 255 subcarriers), while the rest of the cable modems measure the RxMER of a zero-bit-loaded downstream signal received concurrently with the upstream test transmission. These measurements include up to 3800 subcarriers, including ideally the subcarriers of the test CW signals. The advantage of CW sounding is that it ties up a relatively small number of subcarrier frequencies at one time, since interference at those frequencies is tested independently. This allows use of the remainder of the subcarriers for delivery of content. The disadvantage of CW sounding is the length of time that it takes to complete the procedure, which can take up to several minutes. During this time, the full use of the available spectrum is precluded.

OUDP sounding, conversely, occupies the entire spectrum for every test burst from each cable modem, where test bursts may last approximately 20-60 ms, where each test burst includes 3800 measurements, one for each 50 KHz band within the spectrum. Even repeated for a large number of modems, the entire procedure is still much faster than CW sounding. But this procedure prevents any use of the appropriate OFDM spectrum of the CATV plant during an OUDP test burst, since that burst spans the entire OFDM channel. Regardless of whether CW or OUDP sounding is utilized, at peak times of the day a customer could experience jitter or diminished bandwidth due to rounds of sounding.

Disclosed are novel systems and methods that reduce the frequency with which either of the foregoing types of sounding are required. This procedure invokes what will be referred to in this specification as a "baseline" sounding test in which all cable modems measure noise levels present when no signal is being sent in either the upstream or downstream direction. In this procedure, a "baseline CW" test collects, for each cable modem, a noise measurement in each subcarrier frequency utilized by the cable modem while no signal is being sent by any cable modem. A "baseline OUDP" test collects, for each cable modem, 3800 measurements at 50 KHz increments throughout the spectrum utilized by the system. Compared to full sounding procedures like CW and OUDP sounding, baseline sounding consumes far less system resources. Baseline sounding essentially measures noise floors in the transmission path between a head end and the customers' cable modems caused by factors such as standing wave reflections along the transmission path and spurious electromagnetic interference that varies based on the length of a transmission path, ambient weather conditions such as temperature, etc. Many of these factors, however, do not change with time, e.g. transmission length between a head end and a given cable modem, and when changes do occur between sequential baseline sounding measurements, these changes are strongly correlated with network topology changes such as when a cable modem from a customer comes or goes offline, which are frequently the source of changes between full sounding measurements. Thus, the present inventors realized that instead of simply using a periodic sequence of full sounding tests, the disclosed baseline sounding procedure could be used to determine whether a full sounding was needed.

Figure 8:
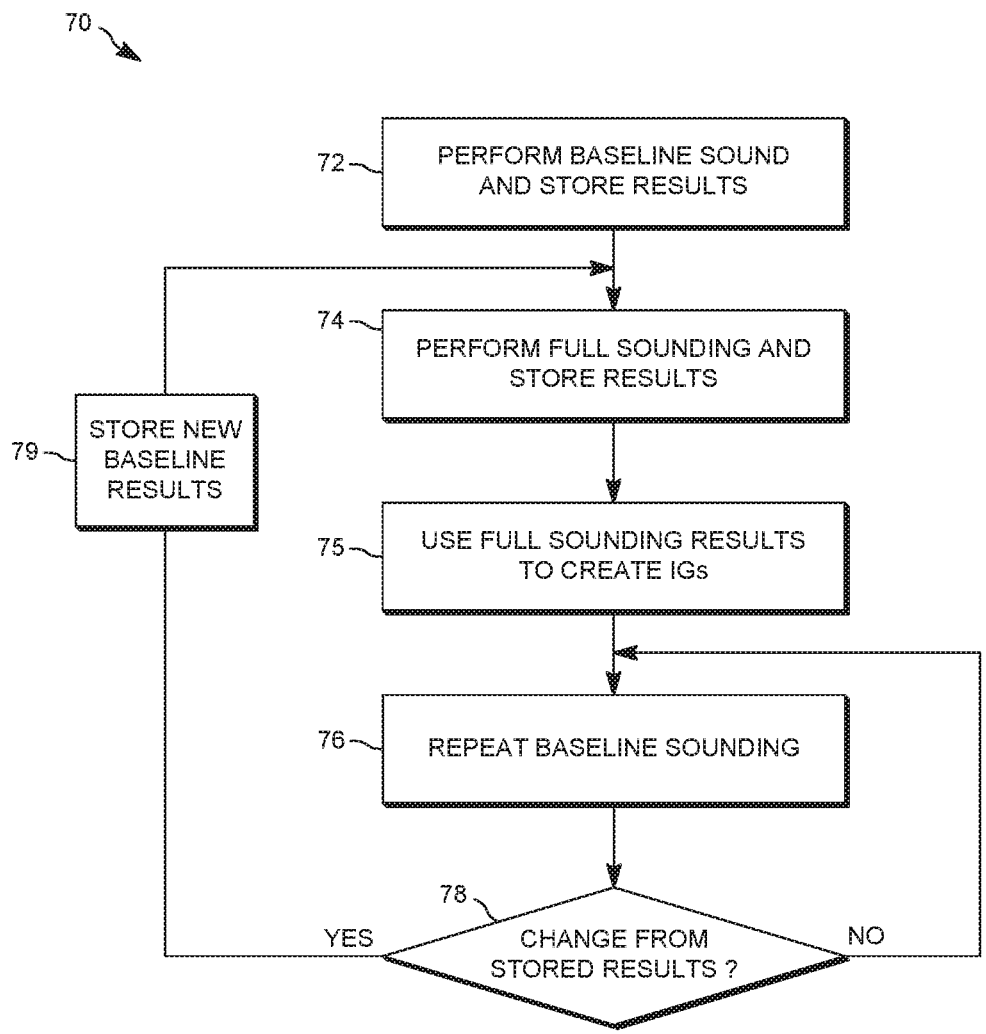
FIG. 8 shows an exemplary method for determining whether to perform a full sounding test based on a baseline sounding test.

Referring specifically to FIG. 8, a system such as the one disclosed in FIG. 1 may use a method 70 that performs a baseline sounding test and stores the results at step 72. The baseline sounding test spans all 3800 frequencies of the OFDM/OFDMA band while no transmissions are occurring. At step 74 a full sounding test is performed and the results are stored, and at step 75 the full sounding results are used to create a set of Interference Groups (IGs). At step 76, a baseline sounding test is performed after an appropriate interval, such as every hour, and at step 78 the results are compared to those measured at step 72 to determine whether a sufficient change in the baseline sounding results has occurred so as to warrant a full round of sounding. For example, a new cell tower installation, recently exposed cabling (which acts as an antenna), or signals from a nearby HAM radio operator may each affect baseline sounding measurements and full sounding measurements, and detecting the change in the baseline sounding results can be used to initiate a full sounding procedure. Alternatively, a new modem may have come online or gone offline, which for which a full round of sounding would be required to determine, at a minimum, which IG a new modem should be added to, or if removal of a modem would warrant splitting an IG. In any of these circumstances, the results measured by the baseline sounding procedure may have included a significant change, such as a change in noise registered by any individual modem in the service group over a set threshold, which would indicate that plant conditions had changed and would again warrant a new full sounding test. In any such circumstance where the comparison determines that a new round of full sounding is warranted, then at step 79 the new baseline results are stored and the procedure returns to step 74 where the full sounding is performed and so forth.

Conversely, if no significant change is observed between the baseline sounding results obtained at step 76 and the most previous baseline sounding results, then no changes to the IGs are needed and the procedure returns to step 76 where another baseline sounding is performed at the next scheduled interval. In some embodiments, a full sounding round may be triggered despite a lack of significant change in baseline sounding results if transmission errors are reported.

As noted earlier, baseline sounding results may change over time due to factors not related to system configuration changes (adding or removing modems, system maintenance on portions of the transmission network, etc.) or other such changes that would likely necessitate a change in interference groups. As one example, baseline sounding results may change based on time of day, ambient weather conditions such as temperature, and other similar factors. Therefore, some embodiments of the present disclosure may store a plurality of different historical baseline sounding results for different days of the week, different times of the day, different temperatures and other weather conditions etc. When a new baseline sounding round is performed, the most relevant one of the stored historical results may be retrieved for comparison.

Figure 9:
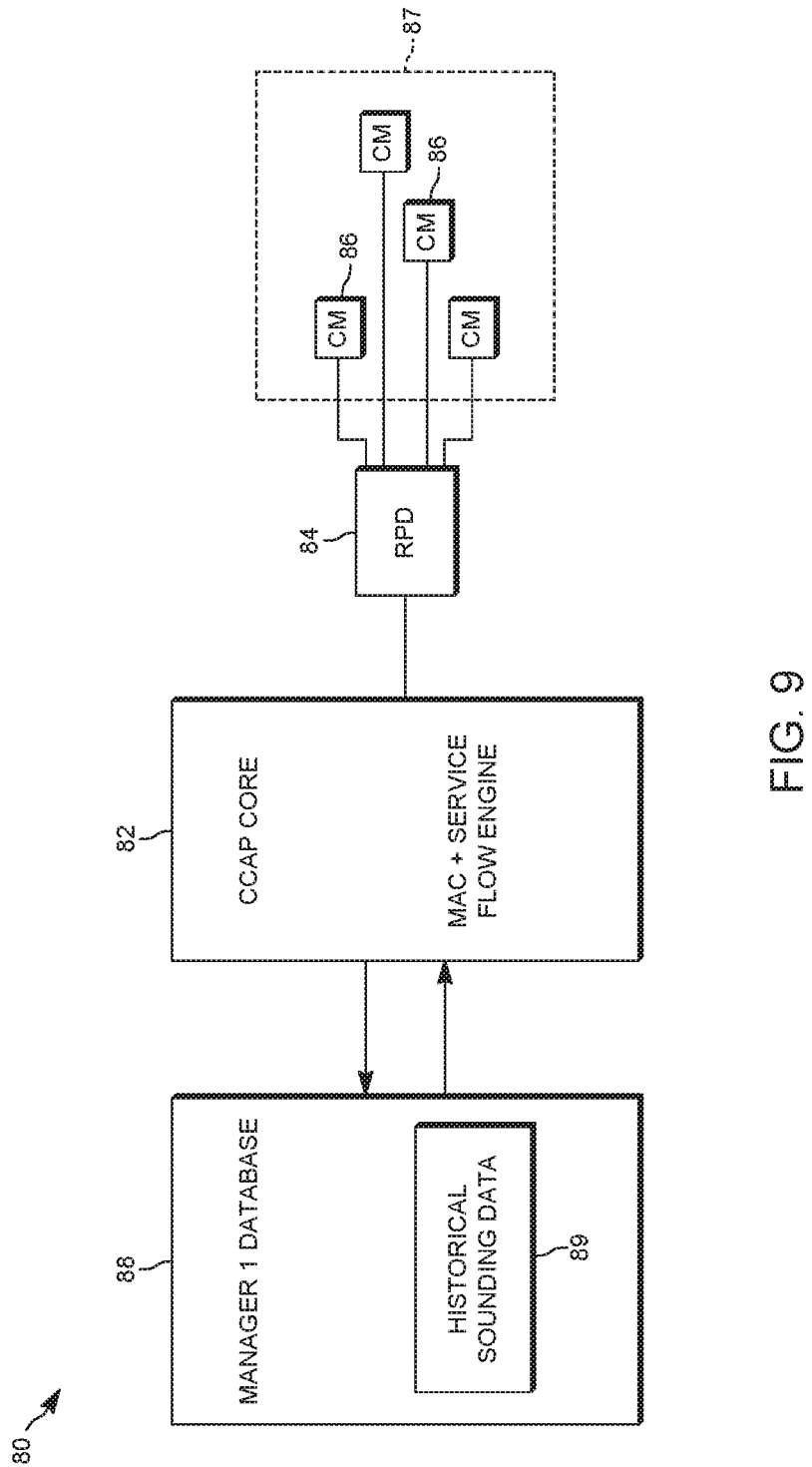
FIG. 9 shows an exemplary system that uses a current baseline sounding test and a selection from a plurality of different records of historical baseline sounding tests to determine whether to perform a full sounding test.

Referring to FIG. 9, for example, such an embodiment may comprise a system 80 that includes a CCAP core 82 connected to a plurality of cable modems 86 at premises of customers via a network of RPDs 84, where the cable modems 86 are assigned to interference groups 87 (only one of which is shown in FIG. 9). As with FIG. 1, the architecture of FIG. 9 is shown as an R-PHY system where the CMTS operates as the CCAP core while Remote Physical Devices (RPDs) are located downstream, but alternate systems may use a traditional CCAP operating fully in a CMTS in a head end, connected to the cable modems 4 via a plurality of nodes/amplifiers.

Figure 10:
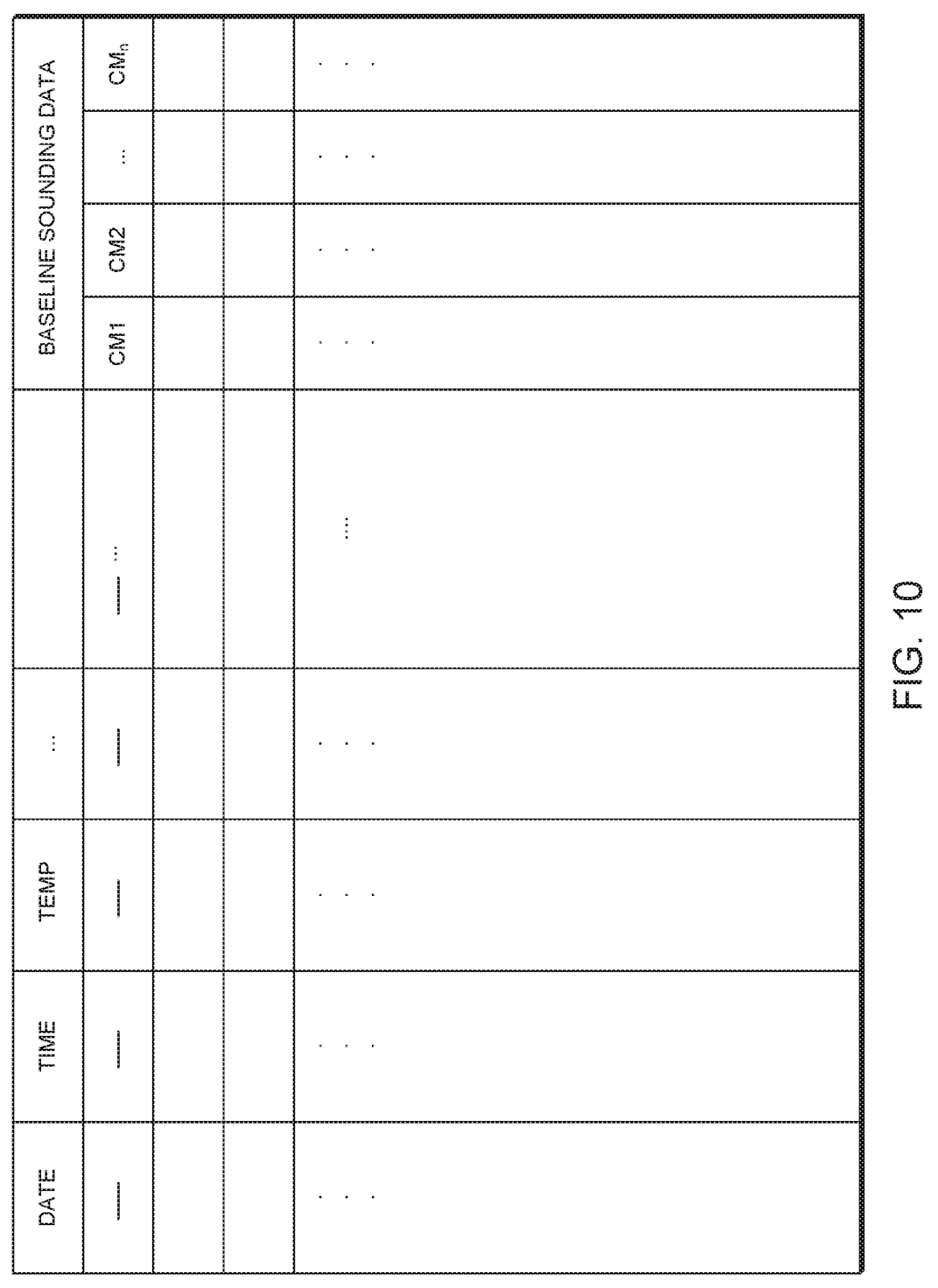

Preferably, the CCAP core 82 or other head end device may be connected to a database 88 that selectively stores historical sounding data in memory 89. FIG. 10 shows an exemplary scheme by which historical baseline sounding records may be stored. Specifically, each round of baseline sounding data may be stored as a record tagged with metadata indicating any or all of the date (which may include the day of the week), the time that the baseline sounding data was collected, weather data such as temperature data corresponding to the location of the CCAP, the RPDs, and each of the cable modems, or any other factor deemed relevant to determining which stored historical baseline sounding record is most closely representative of conditions under which current baseline sounding data is to be compared. For example, if a current baseline sounding test is performed at 5:00 PM, the system 80 may retrieve the historical record that was made for 5:00 PM on the preceding day. In other embodiments, as more data is collected, if a current baseline sounding test is performed at 5:00 PM on a Wednesday, the system 80 may retrieve the historical record that was made for 5:00 PM on the Wednesday of the preceding week. As still more historical data is collected, the system 80 may be able to add more filters, such as temperature and other weather conditions, or other data so that, for example, a historical baseline sounding results may be retrieved that correspond to the same time of day and that most closely match the current weather conditions. In some embodiments, information such as weather conditions on a given date and time may be retrieved after baseline sounding is performed by accessing meteorological servers or other such available databases, and using the retrieved data to populate the baseline sounding records.

In a preferred embodiment, the database 88 with the historical sounding data 89 may be connected remotely to the CCAP core 82, but other embodiments may integrate the CCAP core 82 with the database 88. Similarly, some embodiments may include management or processing functionality with the database 88 remotely connected to the CCAP core 82 such that the CCAP core 82 simply initiates a request for a historical sounding record for comparison to current results, and the manager/database 88 determines the most relevant record and returns the results to the CCAP core 82.

Figure 11:
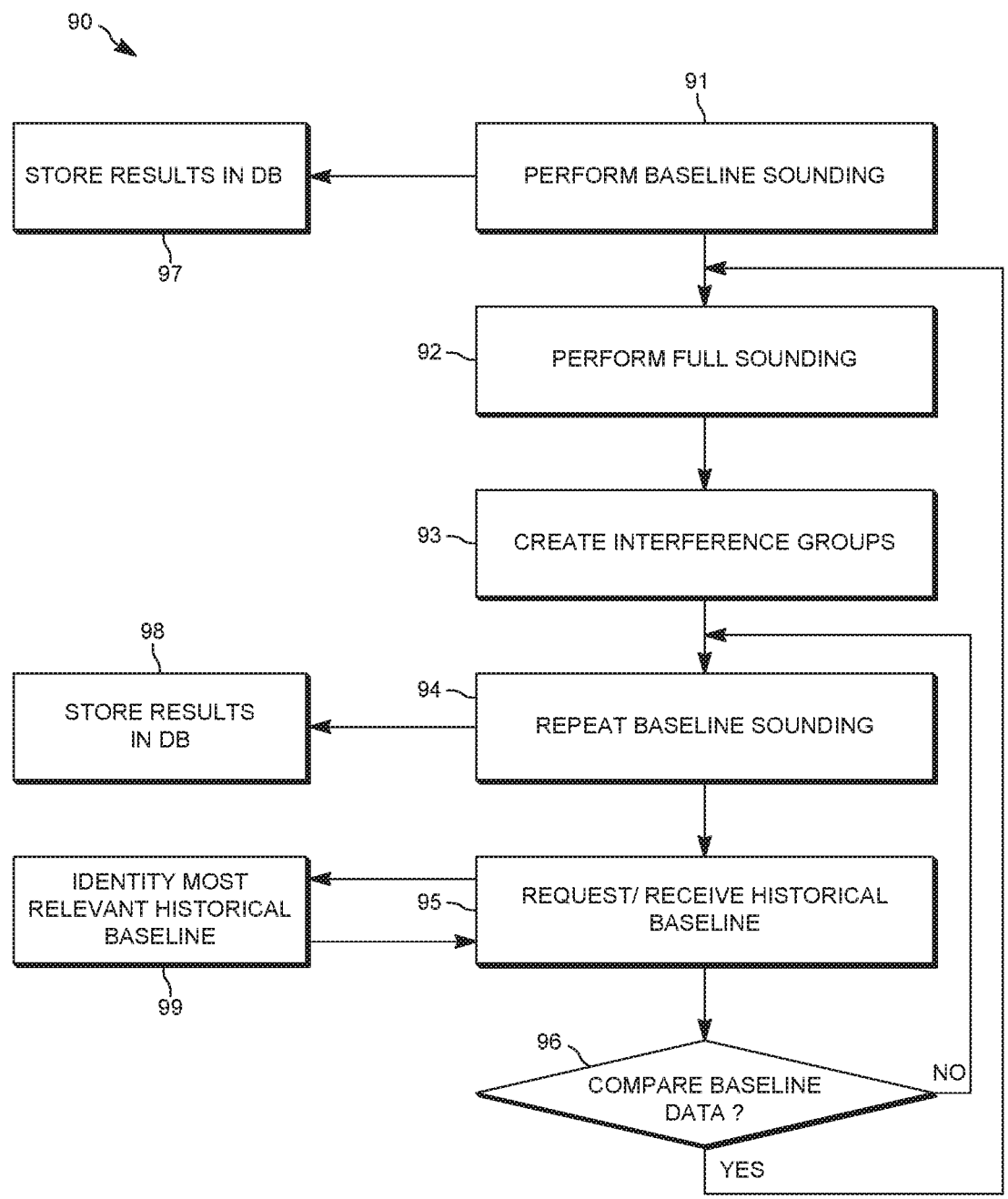
FIG. 11 shows a method used by the system of FIG. 9 to determine whether to perform a full sounding test.

FIG. 11 illustrates an exemplary procedure 90 used by the system of FIG. 9. At step 91 baseline sounding is performed and the results are stored in a database at step 97. At step 92, a full sounding round is performed, and a set of interference groups are created at step 93 based on the results of the full sounding round. At step 94 another baseline sounding round is performed and the results are stored in the database at step 98. At step 95, a request for a historical baseline record from the database is made, and a result is identified and returned from the database at step 99. At step 96 a comparison is made between the historical record returned at step 99 and the current baseline sounding results obtained at step 94. If the comparison shows that another round of full sounding is warranted, the procedure returns to step 92, otherwise the procedure returns to step 94.

In some embodiments, the system and method shown in FIGS. 9 and 11 may employ a statistical model to make the determination about what differences between a current round of sounding and a historical baseline record warrant a new round of full sounding. Specifically, as the system and methods shown are first implemented, full rounds of sounding may be repeatedly gathered while the database 88 shown in FIG. 9 collects baseline sounding results, full sounding results, and information on whether new rounds of full sounding produce changes to Interference Groups. The system may then begin to correlate changes in metrics between a current baseline sounding reading and the most relevant historical record selected by the system (e.g. a maximum difference in baseline sounding reading for any modem) and a likelihood that a change was made in IGs. As more data is collected, the statistical model should become more reliable, and when a certain level of reliability is reached, the system may begin using baseline sounding readings as a proxy for a full sounding round after a desired threshold probability (e.g. 90%, 95% or any other desired threshold) is calculated that another full sounding procedure would produce a change in interference groups.

In other embodiments, system operators may determine empirically what qualitative and quantitative changes in baseline sounding readings are most likely to produce a need for a new round of full sounding.

In some embodiments of the disclosed system, the database 88 may store IGs associated with full sounding results and baseline sounding results, and may select a new IG based on records in the historical database without performing a full sounding test. For example, if there is insufficient bandwidth to perform a full sounding test, the baseline sounding test may be used as a proxy to temporarily select an IG. Alternatively, when a CATV system must be reinitialized, for example after a software update, the historical database may be queried for the most recent set of IGs.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A Cable Modem Termination System (CMTS) in a Cable Television (CATV) system connected to a plurality of modems through a transmission network, the plurality of modems arranged into a first set of at least one interference group (IG), the CMTS capable of reorganizing the plurality of modems into a second set of at least one IG different than the first set of at least one IG, where the CMTS reorganizes the plurality of modems using the first set of at least one IG, and where the system uses a graph-based connected components technique to process an array based on sounding data to reorganize the plurality of modems into the second set of at least one interference group.

2. The CMTS system of claim 1 where the graph-based connected components technique is applied to only a subset of the sounding data, the subset based on identified incremental changes from the first set of at least one interference group.

3. The CMTS system of claim 2 where the identified incremental changes include a pair of modems in the same IG no longer interfering with each other.

4. The CMTS system of claim 2 where the identified incremental changes include a pair of modems in different IGs interfering with each other at a current time, and which were not interfering with each other at a previous time.

5. The CMTS system of claim 1 configured to exchange data between the head end and a plurality of cable modems through the transmission network, where the CMTS selectively initiates periodic baseline sounding tests of the cable modems and periodic full sounding tests of the cable modems, the full sounding tests producing more data than the baseline sounding tests, the CMTS operatively connected to a memory that stores at least one historical baseline sounding test, and a processor that performs a current baseline sounding test and uses a comparison of the current baseline sounding test to the at least one record of a historical baseline test to select whether to initiate a full sounding test.

6. The CMTS system of claim 1 where the graph based connected components technique is based on a graph having nodes and edges.

7. The CMTS system of claim 6 where the nodes correspond to individual cable modems and the edges connect nodes and each have an associated interference metric measured by a sounding procedure on the CATV system.

8. The CMTS system of claim 7 where the graph is undirected.

9. The CMTS system of claim 7 where the graph is directed.

10. A processing system that exchanges data between a head end and a plurality of cable modems through a transmission network, the processing system comprising:
a processor that selectively initiates periodic baseline sounding tests of the cable modems and periodic full sounding tests of the cable modems, the full sounding tests producing more data than the baseline sounding tests;
a memory that stores at least one historical baseline sounding test; where
the processor performs a current baseline sounding test and uses a comparison of the current baseline sounding test to the at least one record of a historical baseline test to select whether to initiate a full sounding test.

11. The processing system of claim 10 operatively connected to a head end connected to a plurality of modems through a transmission network, the plurality of modems arranged into a first set of at least one interference group (IG), the processor capable of reorganizing the plurality of modems into a second set of at least one IG different than the first set of at least one IG, where the processor reorganizes the plurality of modems based on the first set of at least one IG.

12. The processing system of claim 10 where the full sounding tests are a selected one of a Continuous Wave (CW) test and an Upstream Data Profile (OUDP) test.

13. The processing system of claim 10 where the baseline sounding test measures noise at each cable modem when no cable modems are transmitting data.

14. The processing system of claim 13 where the baseline sounding test produces records comprising vectors of per-band noise measurements at a multiplicity of frequency bands spanning a spectrum of interest.

15. The processing system of claim 10 including a database that stores a plurality of historical baseline sounding records, and the processor uses one selected record from among the plurality of historical baseline sounding records to compare to a current baseline sounding test, and uses the comparison to select whether to initiate a full sounding test.

16. The processing system of claim 10 where the at least one record of a historical baseline test includes at least one of a day of the week of each at least one record and a time of day of each at least one record.

17. The processing system of claim 16 where the at least one record of a historical baseline test includes at least one weather metric associated with each at least one record.

18. The processing system of claim 17 where the at least one metric includes ambient temperature data occurring at the time of the baseline sounding test associated with the record.

19. The processing system of claim 17 where the at least one weather metric is obtained from a meteorological database after the at least one record of a historical baseline test is created.

\* \* \* \* \*